US006325106B1

(12) United States Patent
Esser

(10) Patent No.: US 6,325,106 B1
(45) Date of Patent: Dec. 4, 2001

(54) TRANSPORT PIPE FOR SOLID MATERIALS

(75) Inventor: Alexander Esser, Warstein (DE)

(73) Assignee: Esser-Werke GmbH & Co. KG, Warstein (DE)

( * ) Notice: Subject to any disclaimer, the term of this patent is extended or adjusted under 35 U.S.C. 154(b) by 0 days.

(21) Appl. No.: 09/460,332

(22) Filed: Dec. 10, 1999

(30) Foreign Application Priority Data

Nov. 22, 1999 (DE) .............................................. 199 56 174

(51) Int. Cl.[7] .................................................. F16L 57/00
(52) U.S. Cl. ...................... 138/96 T; 138/99; 138/109; 138/155; 285/55; 285/418
(58) Field of Search ................................. 138/96 T, 109, 138/99, 110, 112, 143, 155; 285/53, 55, 145.4, 235, 370, 418, 416, 286.1

(56) References Cited

U.S. PATENT DOCUMENTS

| 4,001,054 | * | 1/1977 | Makepeace | 138/155 |
| 4,011,652 | * | 3/1977 | Black | 285/53 |
| 4,261,769 | * | 4/1981 | Usui | 138/177 |
| 4,366,971 | * | 1/1983 | Lula | 138/96 T |
| 4,509,776 | * | 4/1985 | Yoshida et al. | 285/55 |
| 4,556,240 | * | 12/1985 | Yoshida | 138/143 |
| 4,644,975 | * | 2/1987 | Fricker | 138/110 |
| 5,275,440 | * | 1/1994 | Esser | 138/149 |
| 5,379,805 | * | 1/1995 | Klemm et al. | 138/172 |
| 5,718,461 | * | 2/1998 | Esser | 285/55 |
| 5,813,437 | * | 9/1998 | Esser | 138/172 |

* cited by examiner

Primary Examiner—James Hook
(74) Attorney, Agent, or Firm—Friedrich Kueffner

(57) ABSTRACT

A transport pipe for solid materials has a single layer pipe section having a threaded first end and a thread second end. The pipe section has a hardened inner mantle. A first coupling collar having a first threaded collar is threaded onto the threaded first end. A second coupling collar having a second threaded collar portion is threaded onto the threaded second end. Wear-resistant layers are located in the region of the first and second coupling collars.

4 Claims, 3 Drawing Sheets

TRANSPORT PIPE FOR SOLID MATERIALS

BACKGROUND OF THE INVENTION

1. Field of the Invention

The present invention relates to a transport pipe for transporting solid materials such as sand, gravel or concrete. Such transport pipes are combined to form a pipeline such that each individual solid material transport pipe, in the following referred to as pipe, can be removed transverse to the length of the pipeline and replaced by a new pipe without having to pull the pipeline apart in its longitudinal direction. An exchange of pipes is necessary relatively often in such pipelines for solid material transport because the pipes, as a result of the abrasive nature of the transported material, are subjected to high wear loads at their inner side, especially at the transition area between adjacently arranged pipes.

2. Description of the Related Art

The aforementioned known pipes are, in general, provided at their ends with coupling collars which have circumferential grooves at their outer circumference. Clamping shells having a substantially U-shaped or trapezoidal cross-section are then placed into the grooves of two adjacently positioned coupling collars of two adjacent pipes. These clamping shells are pulled together by clamping or threading means so that in this manner two adjacently arranged pipes can be connected in a pull-resistant and pressure-resistant manner.

The connection of the coupling collars to a single-layer pipe section, hardened at its inner side, is realized such that the coupling collars are pushed by a certain amount over the ends of the pipe section and, subsequently, a fillet weld is produced between the outer surface of the ends and the adjacently arranged end faces of the coupling collar. For this purpose, the ends of the coupling collars facing the pipe section are provided with inner projections by which the coupling collars are correctly positioned at the pipe section.

The manufacture of such a pipe has been performed in the past such that the unhardened pipe sections are produced in overlength cut from a long pipe and then hardened. After hardening, the pipe sections are then cut to the desired length. Subsequently, the coupling collars are welded thereto. This not only results in a relatively high labor expenditure but also frequently in a change of the hardened microstructure of the pipe sections as a result of applying the welding seams. This change is a weak point within the inner wear-resistant area of a pipe in that exactly at the ends which are subjected to greater wear, in particular, when the pipes are angled relative to one another, additional wear will occur so that the pipes have to be removed already after a very short service life.

Furthermore, pipes are known which are provided with coupling collars that are directly connected as an axial extension of each pipe section and are welded to the axial ends of the pipe section by circumferential V-seams. Such pipes are generally hardened after the coupling collars have been welded to the pipe section, and this results in a relatively great expenditure due to the different wall thickness in the area of the pipe section and the coupling collars.

SUMMARY OF THE INVENTION

Therefore, it is the primary object of the present invention to provide a solid material transport pipe whose configuration is beneficial in regard to increasing its service life while, at the same time, manufacture, assembly, and replacement of the pipes in the pipeline are simplified.

In accordance with the present invention, the solid material transport pipe comprises coupling collars at the ends of a single-layer pipe section, that is hardened at its inner side and has inner wear-resistant layers in the area of the coupling collars. The coupling collars are threaded onto the pipe section.

The gist of the invention is to provide a detachable threading connection of the coupling collars at the pipe section of a solid material transport pipe (in the following simply referred to as pipe). This has the great advantage that no heat is required for connecting the coupling collars to the pipe section so that the already finish-manufactured pipe sections and coupling collars are no longer subjected to disadvantageous effects with respect to the inner wear-resistant layers. Instead, the coupling collars and the pipe sections can be produced completely independently and can then be connected by threading. When needed, suitable adhesives can be introduced into the thread connection for sealing and securing the thread connection.

An especially advantageous embodiment is realized by producing the pipe section of a non-hardenable, pressure-resistant steel pipe, for example, St 37, that is carburized at the pipe interior to a defined thickness and is subsequently hardened. When doing so, a sufficiently large exterior wall thickness region is not affected by the carburization and hardening of the inner mantle so that the pipe section, in general, withstands the dynamic and mechanical loading to which a solid material transport pipe is subjected.

Pressure-resistant, non-hardenable steel pipes are expediently not hardened together with the coupling collars, but are hardened as overlength pipe sections without the coupling collars and are then filed or cut to the precise fitting length. However, after hardening it is impossible to weld the coupling collars to the steel pipe without losing the previously generated hardness at the inner side (mantle). This is true even when the inner side is cooled. It is possible to connect the steel pipe and the coupling collars by gluing. However, this entails great technical difficulties, especially for pipelines which are subjected to high pressure. According to the inventive configuration, a thread is cut into the soft, non-carburized outer mantle of the pipe section having a hardened inner mantle and, subsequently, the coupling collars are threaded onto the outer thread of the pipe section.

According to a further advantageous embodiment of the invention, the ends of the coupling collars facing away from their end faces are provided with inner threads and the ends of the pipe section are provided with outer threads. The inner and outer threads can be produced at a non-hardened mantle and can thus be manufactured without problems. In this context, it is especially advantageous that for the inner threads at the coupling collars only radially short flanges extending over a short partial section of the coupling collars must be provided. This means that the amount of material needed for the coupling collar can be reduced considerably.

A third advantageous embodiment of the invention resides in that the wear-resistant layers in the region of the coupling collars are formed by rings hardened at least at their inner side. These rings may extend from the end face of the coupling collars to the area of the threads. The end faces of the ring and of the coupling collars are then positioned in the same cross-sectional planes. The inner diameter of the rings can be smaller than the inner diameter of the pipe section in order to take into consideration the higher wear loads at the transition between two pipes.

Moreover, the rings can have a greater wall thickness in the area of the end faces of the coupling collars than in the area of the pipe section. This measure also allows to take into account the higher wear load at the coupling gap between two pipes.

Furthermore, it is possible to provide two such rings adjacent to one another within the coupling collar, wherein the ring having a shorter axial length and positioned directly adjacent to the coupling gap has a higher wear resistance than the neighboring ring which is positioned adjacent to the inner thread. This embodiment also allows for a stepwise reduction of the inner diameter, beginning at the pipe section, continuing via the adjacently positioned ring, and ending with the ring positioned at the end face of the coupling collar.

A decisive advantage of the above embodiments is that the coupling collars, which are subjected to the greatest wear loads, can be easily removed from the pipe section after decoupling of the pipe section from the pipeline and can be replaced by new coupling collars. The pipe section can thus be used for a much longer period of time for solid material transport.

It is also possible to provide coupling collars having inner threads at their ends facing away from their end faces, wherein the pipe section has outer threads positioned at a spacing from its end faces. In this configuration, the ends of the pipe section can extend past the outer threads to the end faces of the coupling collars. The end faces of the coupling collars and of the pipes section are then positioned in the same transverse planes. In this embodiment, the wear-resistant layers in the area of the coupling collars are thus formed by the hardened inner mantle of the pipe section.

The ends of the pipe section, however, may also end in an area between the end faces of the coupling collars and the outer threads. In this configuration, wear-resistant rings are mounted between the end faces of the pipe section and the end faces of the coupling collars. The inner diameter of the wear-resistant rings is preferably smaller than the inner diameter of the pipe section. The outer diameter of the wear-resistant ring is slightly greater than the outer diameter of the ends of the pipe section. This allows for an enclosure of the wear-resistant rings in the coupling collars.

DESCRIPTION OF THE PREFERRED EMBODIMENTS

Figure 1:
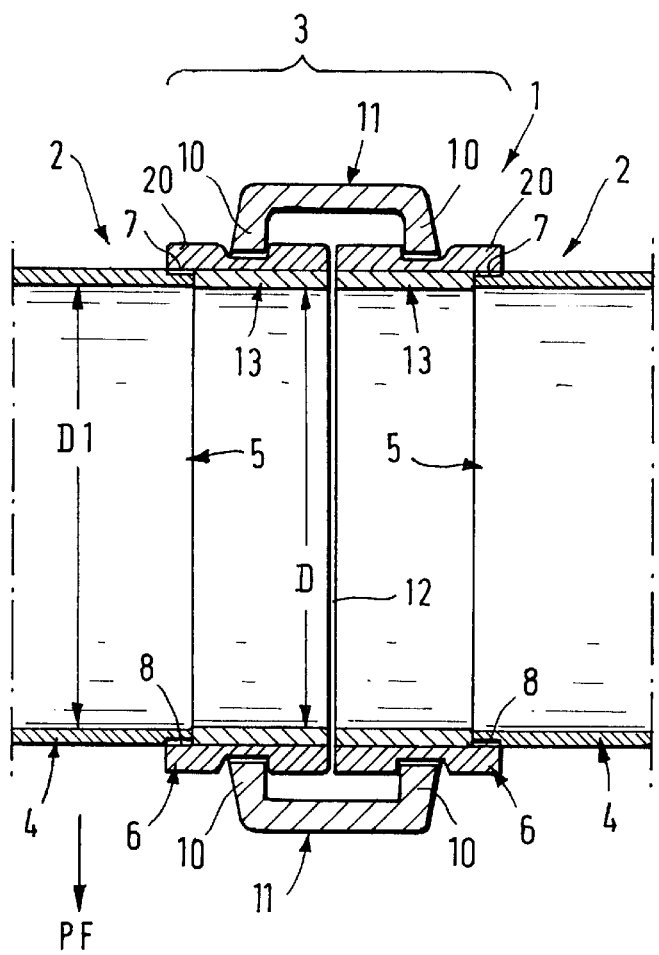
FIG. 1 shows a vertical sectional view of a coupling area between two inventive transport pipes.

FIG. 1 shows a portion of a pipeline 1 for transporting solid materials, wherein the pipeline 1 is comprised of several detachably connected transport pipes 2. The coupling area 3 between two pipes 2 is shown in FIG. 1.

Figure 2:
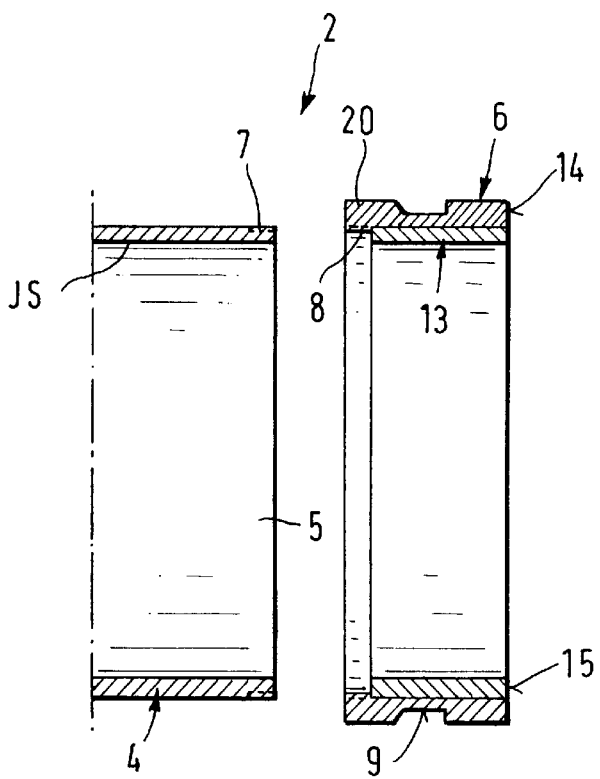
FIG. 2 shows an exploded view of one of the pipe sections of FIG. 1.

As can be seen when comparing FIGS. 1 and 2, each pipe 2 is comprised of a pipe section 4 and two coupling collars 6 at the two ends 5 of the pipe section 4. The pipe section 4 can be straight or curved like an arc.

Based on the fact, that the pipes 2 are used for transporting solid materials such as sand, gravel, or concrete, the pipe sections 4 are hardened at their inner side. The hardened inner mantle IS is represented in FIG. 2 with thicker cross-hatching. At the end of the softer outer mantle (not shown in the drawing) an outer thread 7 is provided.

Each pipe section 4 is comprised of a non-hardenable, pressure-resistant steel pipe, for example, St 37. This steel pipe is carburized at its inner side to a defined wall thickness and is subsequently hardened. Thus, at the outer side a sufficiently thick wall region remains which has not been affected by carburization and which can accordingly be provided with an outer thread.

The coupling collars 6, which are respectively threaded onto the outer threads 7 of the pipe section 4 with their inner threads 8 provided at their ends 20, have a centrally arranged circumferential groove 9. These grooves 9 are configured to be engaged by the legs 10 of two semicircular clamping shells 11 which have a trapezoidal cross-section. These clamping shells 11 are tightened by non-represented clamping means so that two adjacently positioned pipes 2 are connected to one another across the coupling gap 12 in a pull-resistant and pressure-resistant manner.

The coupling collars 6 are generally not hardened and have an inner wear-resistant layer 13 which, in the embodiment according to FIGS. 1 and 2, is provided in the form of a ring. These wear-resistant layers 13 are hardened at least at their inner side. They have, as can be seen especially in FIG. 1, a smaller diameter D than the diameter D1 of the pipe section 4 of the pipes 2. This configuration takes into account the greater wear load of the coupling collars 6 in the area of the coupling gap 12.

When one of the pipes 2 is worn, it is only necessary to release the clamping shells 11 at the ends of the pipe 2 and to remove them from the pipeline 1. Subsequently, the pipe 2 itself can be removed transversely from the pipeline 1 in the direction of arrow PF, and a new pipe 2 can be inserted. In order to do this, the pipeline 1 must not be pulled apart in the longitudinal direction. After insertion of a new pipe 2, the clamping shells 11 are reinserted with their legs 10 into the grooves 9 and tightened. The pipeline 1 is again functional.

As can be seen in FIGS. 1 and 2, the wear-resistant layers 13 extend between the inner threads 8 and the end faces 14 of the coupling collars 6. The end faces 14 of the coupling collars 6 and the end faces 15 of the wear-resistant layers 13 are thus positioned in one and the same transverse plane.

Figure 3:
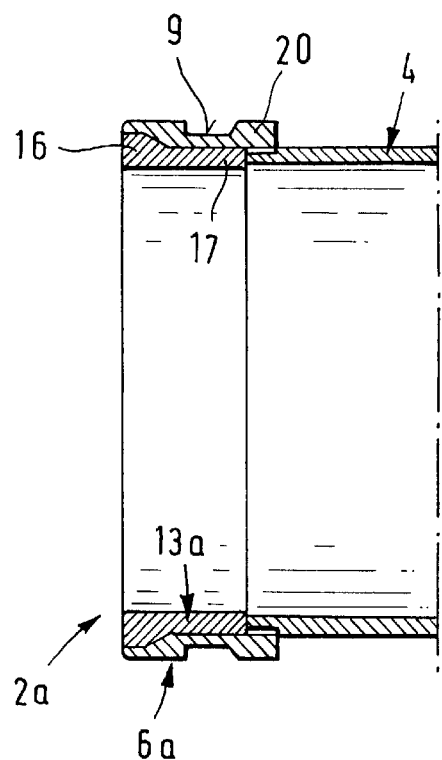
FIG. 3 is a vertical sectional view of the end portion of a pipe according to a second embodiment.

The embodiment of FIG. 3 of a pipe 2a for transporting solid materials differs from that of FIGS. 1 and 2 in that the wear-resistant layer 13a in the form of a ring positioned in coupling collar 6a has an end 16 having a wall thickness which is greater than that of the region 17 of the layer 13a adjacent to the pipe section 4. Accordingly, the coupling collar 6a in this area is provided with a deeper recess to accommodate the end 16. It is thus possible in an even more beneficial way to take into account the wear load of a pipe 2a in the region adjacent to the coupling gap 12. The configuration of FIG. 3 corresponds otherwise to that of FIGS. 1 and 2.

Figure 4:
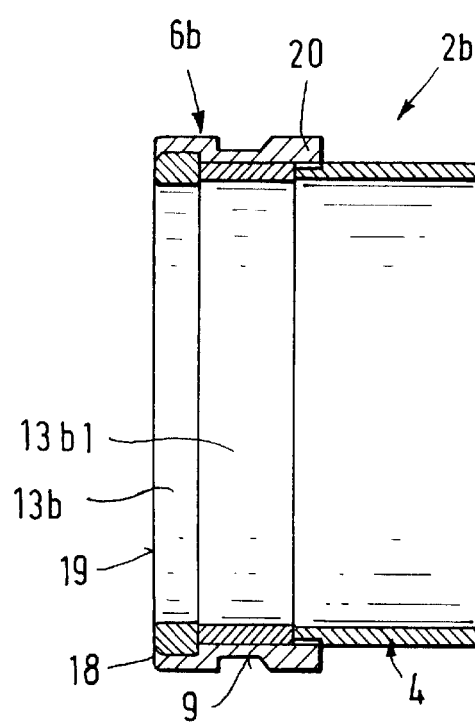
FIG. 4 shows a vertical sectional view of the end portion of a pipe according to a third embodiment.

In the embodiment of FIG. 4 of a pipe 2b for transporting solid materials, the wear-resistant layers 13b, 13b1 at the inner side of a coupling collar 6b is formed by two adjacently positioned rings. The wear-resistant layer 13b1 adjacent to the pipe section 4 is wider than the wear-resistant layer 13b adjacent to the end face of the pipe 2b. The inner diameters of the wear-resistant layers 13b, 13b1 are stepped relative to the inner diameter of the pipe section 4, with the outer wear-resistant layer 13b having the smallest inner diameter. The hardness of the wear-resistant layers 13b, 13b1 is also stepped so that the wear loads occurring at the end of pipe 2b can be taken into consideration more directly. In other respects, the embodiment of FIG. 4 corresponds to that of FIGS. 1 and 2.

The fixation of the wear-resistant layers 13, 13a, 13b, 13b1 (embodied as rings in the embodiments of FIGS. 1 through 4) in the coupling collars 6, 6a, 6b can be achieved by wedging or by means of an adhesive. In the embodiment of FIG. 4 it can be seen, however, that the region 18 at the inner end face of the coupling collar 6b is crimped across the end face 19 of the wear-resistant layers 13b so that the wear-resistant layers 13b, 13b1 are secured in the coupling collar 6b by the crimped portion 18. Before assembly of the pipe section 4 and of the coupling collars 6, 6a, 6b, the wear-resistant layers 13, 13a, 13b, 13b1 are positioned at the steps formed by the inner threads 8.

Figure 5:
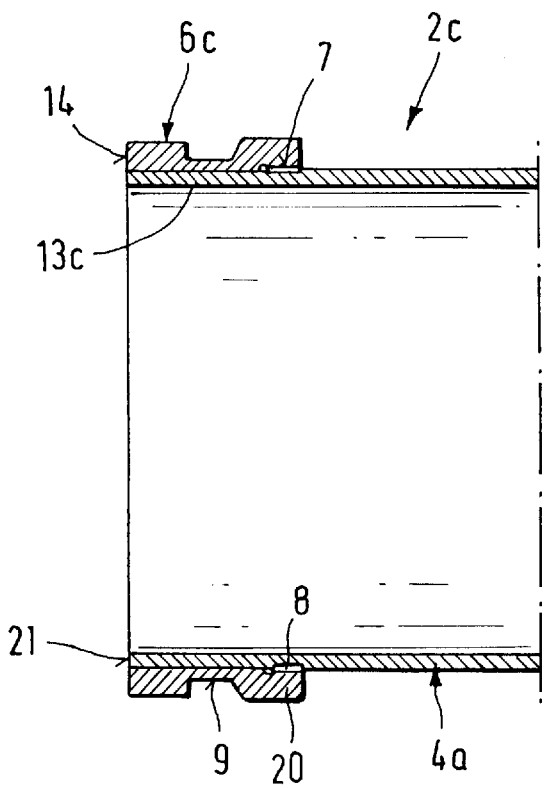
FIG. 5 shows a vertical sectional view of the end portion of a pipe according to a fourth embodiment.

FIG. 5 illustrates an embodiment of a pipe 2c for solid material transport in which the end faces 21 of the pipe section 4a are positioned in a transverse plane together with the end faces 14 of the coupling collar 6c. Accordingly, the wear-resistant layers 13c positioned in the area of the coupling collars are thus formed by the hardened inner mantle of the pipe section 4a.

For tightening the coupling collars 6c to the pipe section 4a, outer threads 7 are provided at a spacing to the end faces 21 of the pipe section 4a. The inner threads 8 of the coupling collars 6c can be threaded onto the outer threads 7.

Otherwise, the configuration of FIG. 5 corresponds to that of FIGS. 1 and 2 so that the description details provided supra apply here also.

Figure 6:
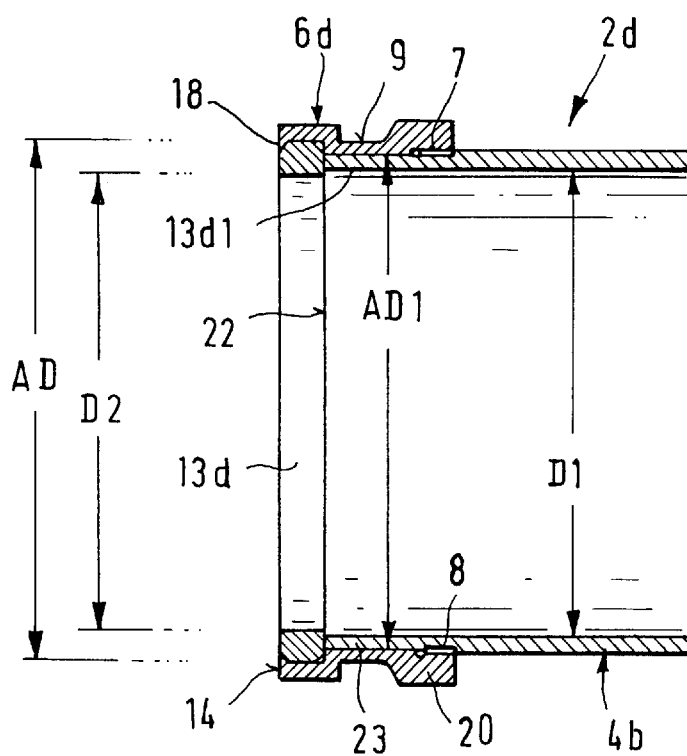
FIG. 6 shows a vertical sectional view of the end portion of a pipe according to a fifth embodiment.

The embodiment of the pipe 2d for solid material transport according to FIG. 6 has a pipe section 4b also having a hardened inner mantle and having end faces 22 that project axially past the outer threads 7. However, the end faces 22 are axially inwardly spaced from the end faces 14 of the coupling collars 6d. The portions between the end faces 14 of the coupling collars 6d and the end faces 22 of the pipe section 4b are filled by annular wear-resistant layers 13d. The inner diameter D2 of the wear-resistant layers 13d is smaller than the inner diameter D1 of the pipe section 4b. Furthermore, it can be seen that the outer diameter AD of the wear-resistant layers 13d is greater than the outer diameter AD1 of the ends 23 of the pipe section 4b, connected by the outer threads 7 to the coupling collars 6d and provided with a hardened, wear-resistant inner mantle 13d1, so that the wear-resistant layers 13d are embraced by the coupling collars 6d. For additionally securing the wear-resistant layers 13d, the inner end regions 18 of the coupling collars 6d positioned at the end faces can be crimped inwardly as shown in the embodiment of FIG. 4.

While specific embodiments of the invention have been shown and described in detail to illustrate the inventive principles, it will be understood that the invention may be embodied otherwise without departing from such principles.

What is claimed is:

1. A transport pipe for solid materials comprising:
   a single layer pipe section having a threaded first end and a threaded second end;
   a first coupling collar having a first threaded collar portion configured to be threadedly connected to the threaded first end;
   a second coupling collar having a second threaded collar portion configured to be threadedly connected to the threaded second end;
   wear-resistant layers located adjacent the first and second coupling collars;
   the pipe section having a hardened inner mantle, wherein the threaded first and second ends have outer threads and wherein the first and second coupling collars each have an end face facing away from the pipe section, wherein the first and second threaded collar portions are inner threads positioned remote from the end faces of the coupling collars, and wherein each coupling collar has a centrally arranged circumferential groove, further comprising two semi circular clamping shells configured to engage in the grooves, such that two adjacently positioned pipes are connected to each other by the clamping shells.

2. The transport pipe according to claim 1, wherein the pipe section is comprised of a non-hardenable, pressure resistant steel pipe carburized at an inner side to a defined wall thickness of the pipe section and subsequently hardened to form the hardened inner mantle.

3. The transport pipe according to claim 1, wherein the wear-resistant layers are rings hardened at least within a radially inner region.

4. The transport pipe according to claim 1, wherein the threaded first and second ends have outer threads positioned at an axial spacing from end faces of the pipe section and wherein the first and second coupling collars each have an end face facing away from the pipe section, wherein the first and second threaded collar portions are inner threads positioned remote from the end faces of the coupling collars.

* * * * *